US012077987B2

(12) United States Patent
Lin et al.

(10) Patent No.: US 12,077,987 B2
(45) Date of Patent: Sep. 3, 2024

(54) PASSWORD LOCK

(71) Applicant: XIAMEN MAKE SECURITY TECHNOLOGY CO., LTD., Fujian (CN)

(72) Inventors: Shaolian Lin, Xiamen (CN); Shaojian Lin, Xiamen (CN)

( * ) Notice: Subject to any disclaimer, the term of this patent is extended or adjusted under 35 U.S.C. 154(b) by 426 days.

(21) Appl. No.: 17/617,940

(22) PCT Filed: Jun. 25, 2019

(86) PCT No.: PCT/CN2019/092651
§ 371 (c)(1),
(2) Date: Dec. 10, 2021

(87) PCT Pub. No.: WO2020/258000
PCT Pub. Date: Dec. 30, 2020

(65) Prior Publication Data

US 2022/0307290 A1 Sep. 29, 2022

(51) Int. Cl.

| | |
|---|---|
| ***E05B 37/02*** | (2006.01) |
| ***E05B 17/14*** | (2006.01) |
| ***E05B 35/08*** | (2006.01) |
| ***E05B 37/00*** | (2006.01) |

(52) U.S. Cl.
CPC .......... *E05B 37/02* (2013.01); *E05B 37/0037* (2013.01); *E05B 37/0041* (2013.01); *E05B 17/145* (2013.01); *E05B 35/083* (2013.01); *E05B 37/0031* (2013.01)

(58) Field of Classification Search
CPC .. E05B 37/02; E05B 37/0031; E05B 37/0034; E05B 37/0037; E05B 37/0041; E05B 37/0048; E05B 17/145; E05B 35/083
See application file for complete search history.

(56) References Cited

U.S. PATENT DOCUMENTS 8,087,274 B2 * 1/2012 Yu .......................... E05B 37/02 70/284
8,234,891 B2 * 8/2012 Dalton, Jr. ............ E05B 13/103 70/284
8,316,675 B2 * 11/2012 Yang ..................... E05B 13/106 70/284
9,222,283 B1 * 12/2015 Zhang ................. E05B 37/0034
10,329,795 B2 * 6/2019 Roatis ..................... E05C 3/042
10,513,871 B2 * 12/2019 Wang ...................... E05B 1/003

(Continued)

FOREIGN PATENT DOCUMENTS

DE 202013004044 U1 * 8/2013 ......... E05B 37/0034

*Primary Examiner* — Christine M Mills
*Assistant Examiner* — Faria F Ahmad

(57) ABSTRACT

Disclosed is an improved password lock, comprising a housing, a lock case, a password box, and a tongue; the housing is composed of a shell and a panel; the panel is fixed on the top surface of the shell to form an accommodating cavity of the housing; the middle part of the lock case is rotatably sleeved at one side of the housing; the password box is installed in the accommodating cavity of the housing, and the password box is cooperatively linked with the lock case; and the tongue is fixedly sleeved on a penetrating end, penetrating through the housing, of the lock case. The lock case can drive a slide block in the password box to move horizontally for changing a password, and therefore the operation is convenient.

7 Claims, 14 Drawing Sheets

(56) References Cited

U.S. PATENT DOCUMENTS

| | | | | |
|---|---|---|---|---|
| 11,814,872 | B2* | 11/2023 | Lin | E05B 37/02 |
| 2004/0011098 | A1* | 1/2004 | Yang | E05B 13/002 70/284 |
| 2007/0144226 | A1* | 6/2007 | Miao | E05B 37/16 70/214 |
| 2007/0214850 | A1* | 9/2007 | Ma | E05B 35/105 70/284 |
| 2009/0301147 | A1* | 12/2009 | Yang | E05B 37/02 70/284 |
| 2018/0106072 | A1* | 4/2018 | Wu | E05B 37/0034 |
| 2021/0396042 | A1* | 12/2021 | Lin | E05B 37/0048 |

* cited by examiner

PASSWORD LOCK

BACKGROUND OF THE INVENTION

1. Field of the Invention

The present invention relates to a lock, and more particularly to an improved password lock.

2. Description of the Prior Art

A combination lock has the convenience of an electronic code lock and the stability of a mechanical lock, so it is widely used. It has a unique operation, turning a password wheel to a preset number to enter a digit of the password. The other password wheels are also turned until the last digit of the password is entered to unlock the lock.

On Jan. 11, 2019, Chinese Patent Publication No. CN109184337A disclosed an automatic messy code character wheel coded lock. The coded lock of this patent adopts the method of pushing the code change buttons when the coded lock needs to change the password. It is inconvenient to operate and affects the appearance. In some public applications, such as supermarkets, swimming pools, etc., there are many users to use locks, so the password is frequently changed according to different users. As to the coded lock of this patent, the password is frequently entered to push the code change button for resetting the password, which is inconvenient to operate.

SUMMARY OF THE INVENTION

The primary object of the present invention is to provide an improved password lock that is easy to operate. The password lock has the function of automatically resetting password wheels, and the password can be changed by rotating the lock case.

In order to achieve the above object, the present invention adopts the following technical solutions:

An improved password lock comprises a housing, a lock case, and a password box. The lock case is rotatably fitted in one side of an accommodating cavity of the housing. The password box is installed in another side of the accommodating cavity of the housing. The password box is cooperatively linked with the lock case.

An outer wall of the lock case has an inner cam groove arranged along an axial direction of the lock case rotating in the housing, a radial groove arranged along a radial direction of the lock case rotating in the housing, a transverse groove arranged along the axial direction of the lock case rotating in the housing, and a raised block disposed between the radial groove and the transverse groove. The inner cam groove is composed of a plurality of transverse groove segments and a plurality of inclined groove segments.

The password box includes a base, a cover, a holder, a slide block, a password shaft assembly, a plurality of bushings, a plurality of password wheel assemblies, a block ring, a plurality of password wheel positioning members, a plurality of buckles, a return elastic plate, a lifting rod, a password shaft spring, and a password change spring. The cover is fixed to a top surface of the base. The bushings are rotatably inserted through middle holes of the password wheel assemblies, respectively. Two ends of the password shaft assembly movably pass through two ends of the holder, respectively. The password wheel assemblies with the bushings are confined in the holder. The slide block is movably sleeved on one end of the password shaft assembly and located outside the holder close to the lock case. The stop ring is movably sleeved on the other end of the password shaft assembly and located outside the holder. The plurality of password wheel positioning members and the plurality of buckles are connected at intervals. The plurality of password wheel positioning members and the plurality of buckles are installed under the plurality of password wheel assemblies. An inner end of each password wheel positioning member abuts against external teeth of a corresponding one of the password wheel assemblies to restrict rotation of the corresponding password wheel assembly. The return spring is disposed between the inner end of the password wheel positioning member and the base. An outer end of each password wheel positioning member is movably in contact with the lifting rod. The lifting rod is disposed under the password shaft assembly. One end of the lifting rod is inserted in the inner cam groove of the lock case by clearance fit and is moved up and down along with rotation of the lock case. The password shaft spring is disposed between the password shaft assembly and the stop ring. The password change spring is sleeved on the stop ring. Two ends of the password change spring are pressed against the holder and the stop ring, respectively.

The lock case includes an upper lock case, a lower lock case, a lock tongue spring, a lock tongue, and a lock core. The upper lock case is fixedly engaged with the lower lock case. The lock tongue is movably installed in a space formed by the upper lock case and the lower lock case. An outer end of the lock tongue extends outwardly. The lock tongue spring abuts against an inner end of the lock tongue. The lock core is fixedly fitted in the upper lock case.

Each password wheel assembly includes a password wheel, the external teeth, a plurality of password wheel magnets, and a plurality of sealing sheets. The external teeth are fixed on a side wall of the password wheel. The password wheel is formed with magnet mounting grooves. The password wheel magnets are installed in the magnet mounting grooves of the password wheel and are covered by the sealing sheets, respectively.

The password shaft assembly includes a password shaft and a plurality of password shaft magnets. The password shaft magnets are inlaid on a side wall of the password shaft. A plurality of protrusions are provided along an axial direction of the password shaft. Magnetic poles of the password shaft magnets are distributed along a radial direction of the password shaft and face opposite magnetic poles of the password wheel magnets in the password wheel assembly.

The two ends of the holder each have a baffle perpendicular to the axial direction of the password shaft. A shaft hole is defined in a center of the baffle.

The improved password lock further comprises a tongue. The tongue is fixedly sleeved on a penetrating end, penetrating through the housing, of the lock case.

The housing is composed of a shell and a panel. The panel is fixed on a top surface of the shell to form the accommodating cavity of the housing.

After adopting the above solution, because the present invention includes the housing, the lock case, the password box, and the tongue. When the lock case is rotated, the lock tongue on the lock case will drive the slide block in the password box to move horizontally, so as to perform the operation of changing the password. The lock has the advantage of convenient operation.

Embodiments of the present invention will now be described, by way of example only, with reference to the accompanying drawings.

DETAILED DESCRIPTION OF THE PREFERRED EMBODIMENTS

Figure 1:
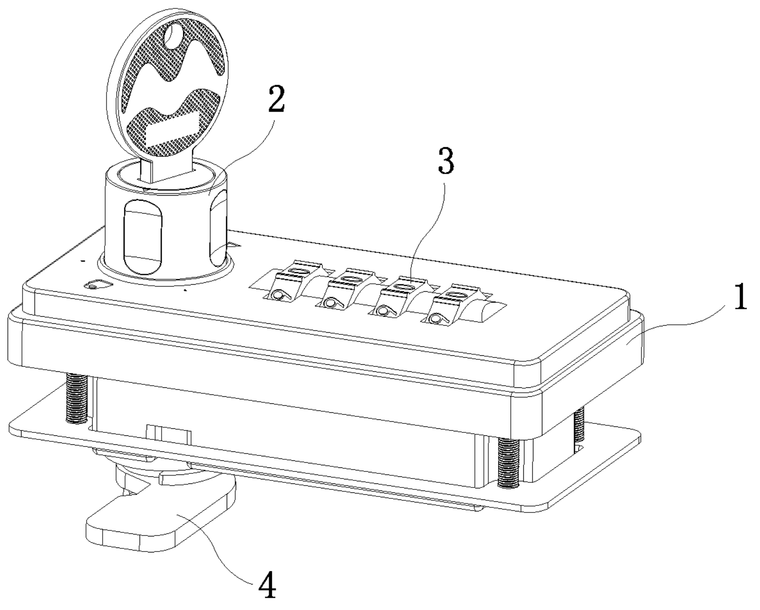
FIG. 1 is a perspective view of the present invention.
Figure 2:
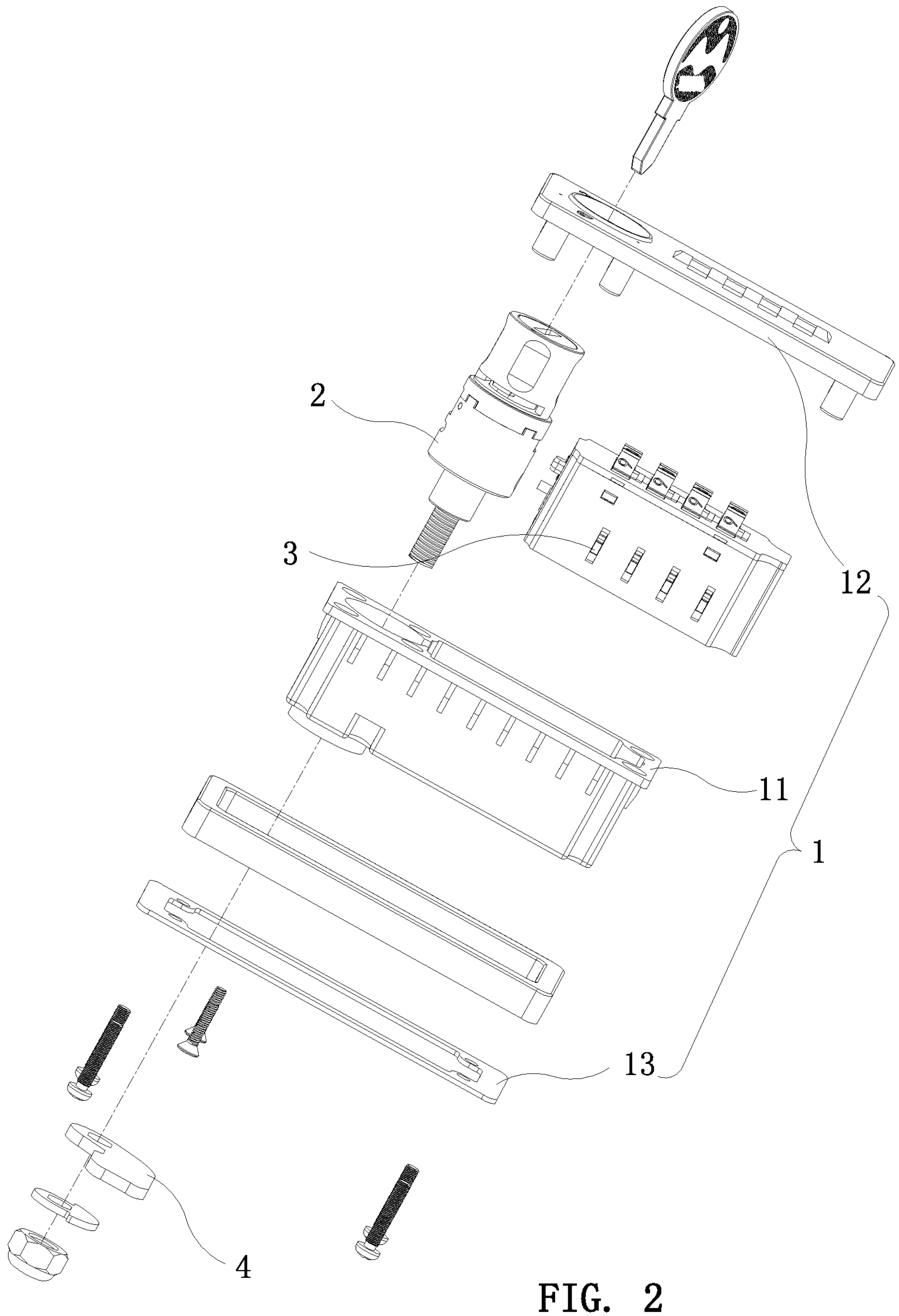
FIG. 2 is an exploded view of the present invention.

As shown in FIG. 1 and FIG. 2, the present invention discloses an improved password lock, comprising a housing 1, a lock case 2, a password box 3, and a tongue 4.

The housing 1 is composed of a shell 11 and a panel 12. The panel 12 is fixed on the top surface of the shell 11 to form an accommodating cavity of the housing 1. The lock case 2 is rotatably fitted in one side of the accommodating cavity of the housing 1. The password box 3 is installed in the other side of the accommodating cavity of the housing 1. The password box 3 is cooperatively linked with the lock case 2. The tongue 4 is fixedly sleeved on a penetrating end, penetrating through the housing 1, of the lock case 2.

Figure 3:
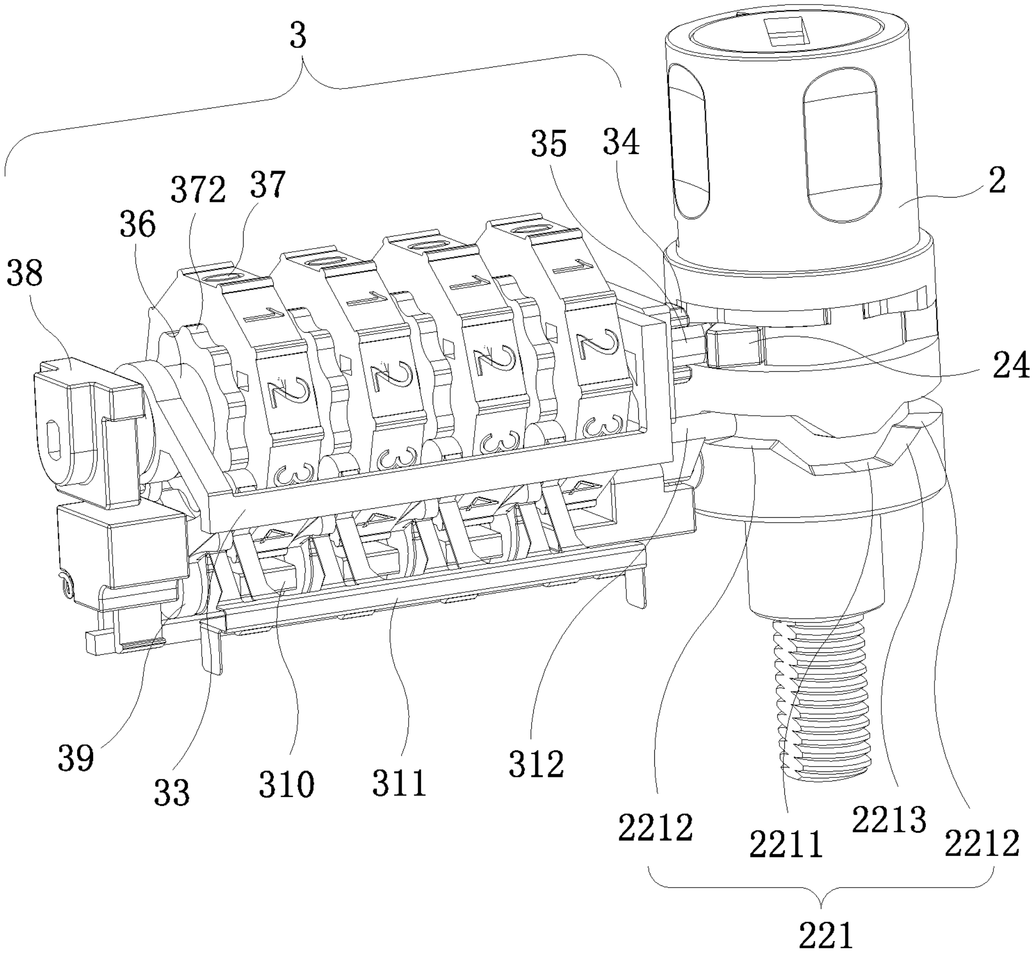
FIG. 3 is a perspective view of the cooperation between the lock case and the password box of the present invention.
Figure 4:
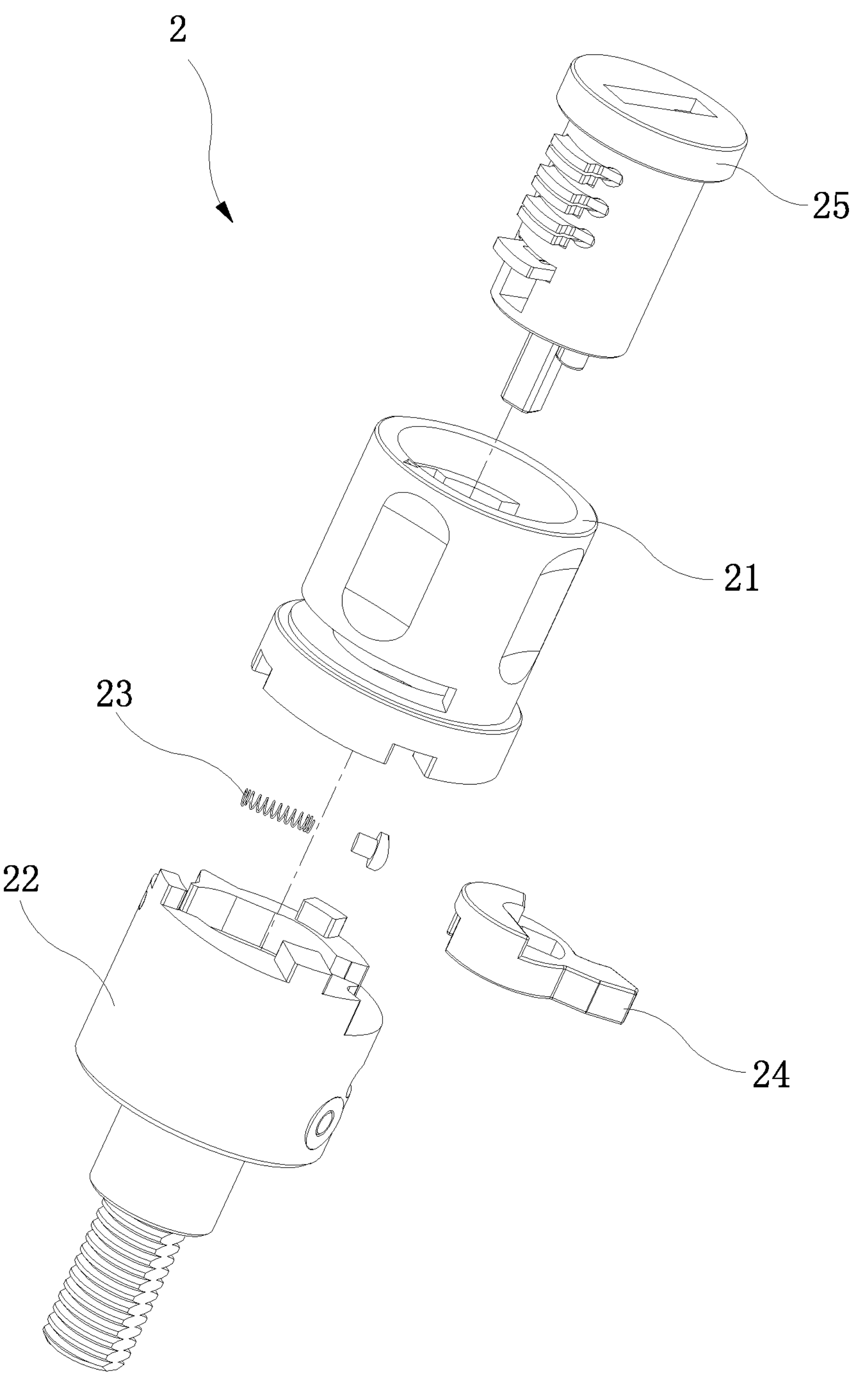
FIG. 4 is an exploded view of the lock case of the present invention.
Figure 16:
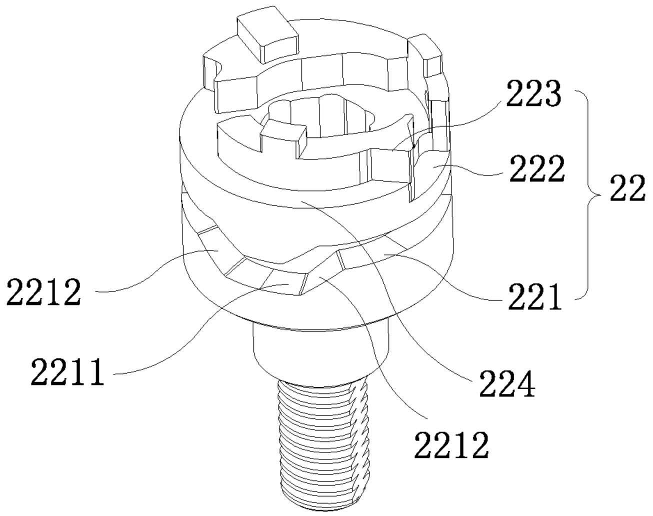
FIG. 16 is a schematic view of the top of the lower lock case according to a first embodiment of the present invention.

As shown in FIG. 3 and FIG. 4, the lock case 2 includes an upper lock case 21, a lower lock case 22, a lock tongue spring 23, a lock tongue 24, and a lock core 25. The upper lock case 21 is fixedly engaged with the lower lock case 22. The lock tongue 24 is movably installed in the space formed by the upper lock case 21 and the lower lock case 22. The outer end of the lock tongue 24 extends outwardly. The lock tongue spring 23 abuts against the inner end of the lock tongue 24. The lock core 25 is fixedly fitted in the upper lock case. Referring to FIG. 16, the outer wall of the lower lock case 22 has an inner cam groove 221 arranged along the axial direction of the lower lock case 22 rotating in the housing 1, a radial groove 222 arranged along the radial direction of the lower lock case 22 rotating in the housing 1, a transverse groove 224 arranged along the axial direction of the lower lock case 22 rotating in the housing 1, and a raised block 223 disposed between the radial groove 222 and the transverse groove 224. The inner cam groove 221 is composed of a plurality of transverse groove segments 2211 and a plurality of inclined groove segments 2212.

Figure 5:
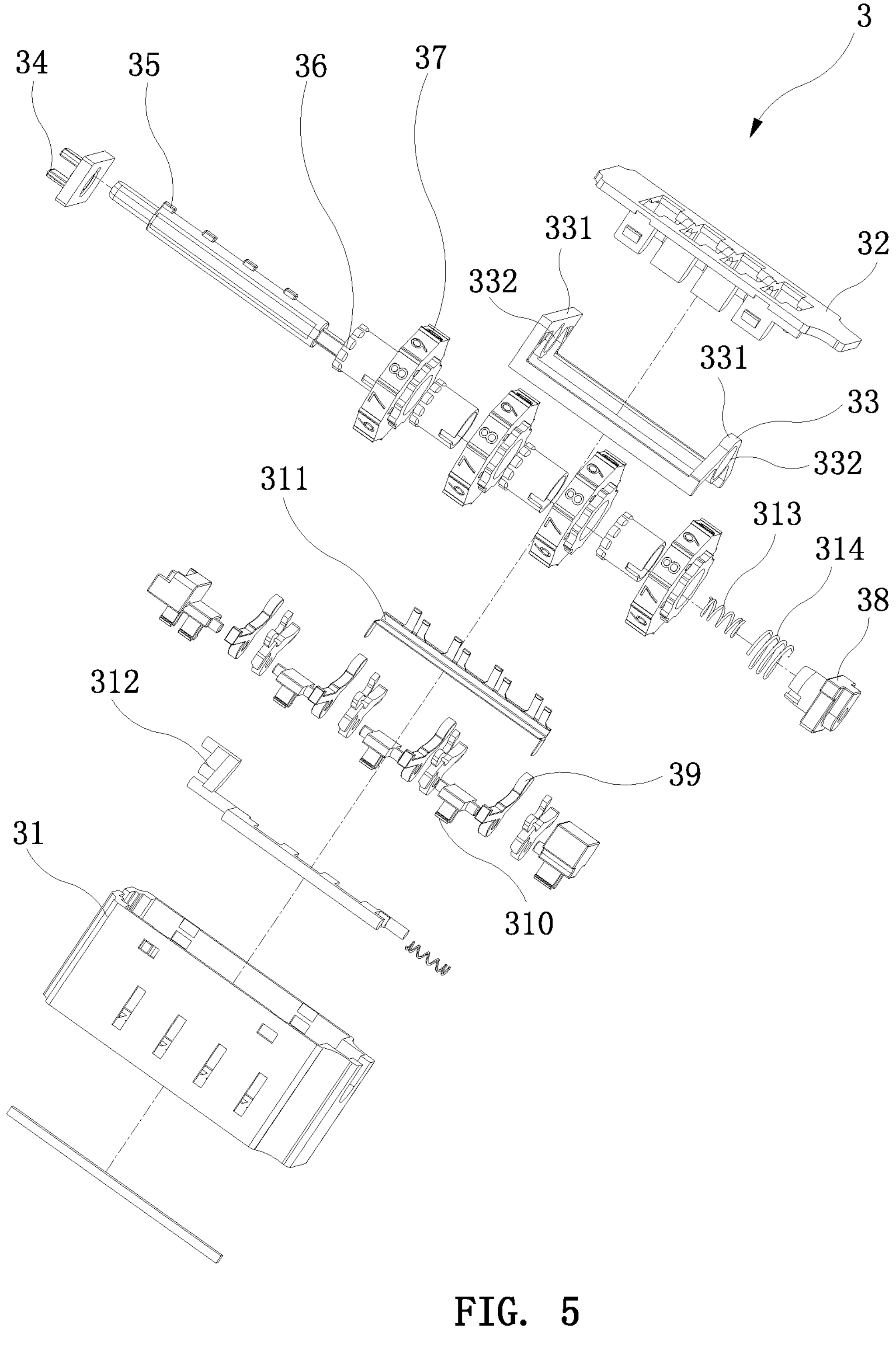
FIG. 5 is an exploded view of the password box of the present invention.
Figure 9:
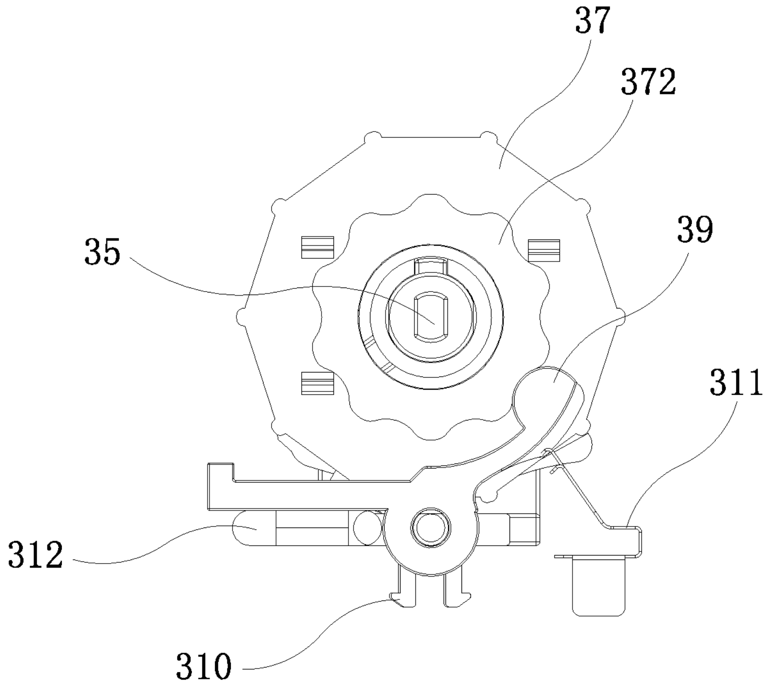
FIG. 9 is a schematic view of the assembly of the password shaft assembly and the password wheel assembly of the present invention.
Figure 10:
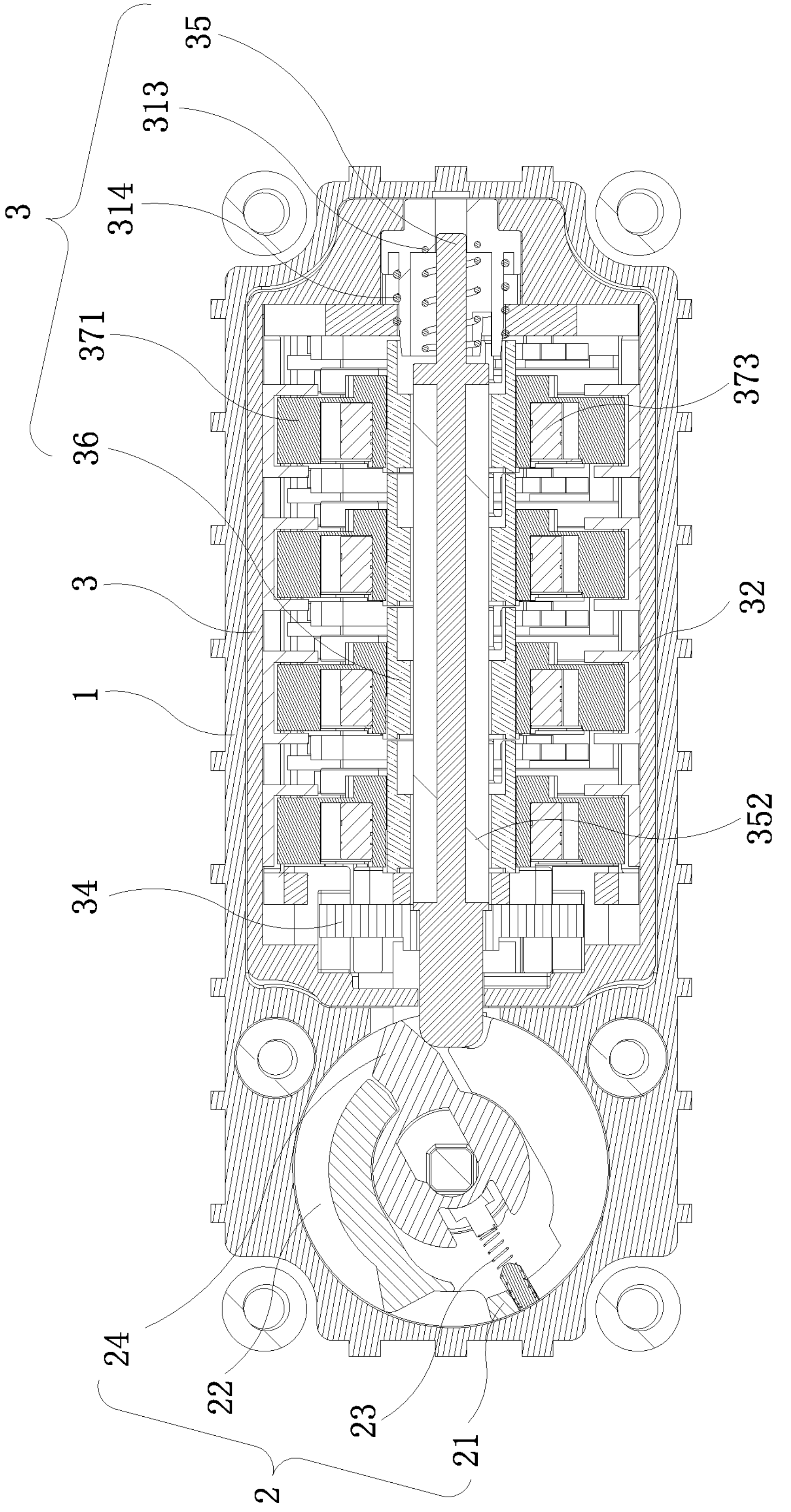
FIG. 10 is a transverse cross-sectional view of the present invention in a locked state.
Figure 11:
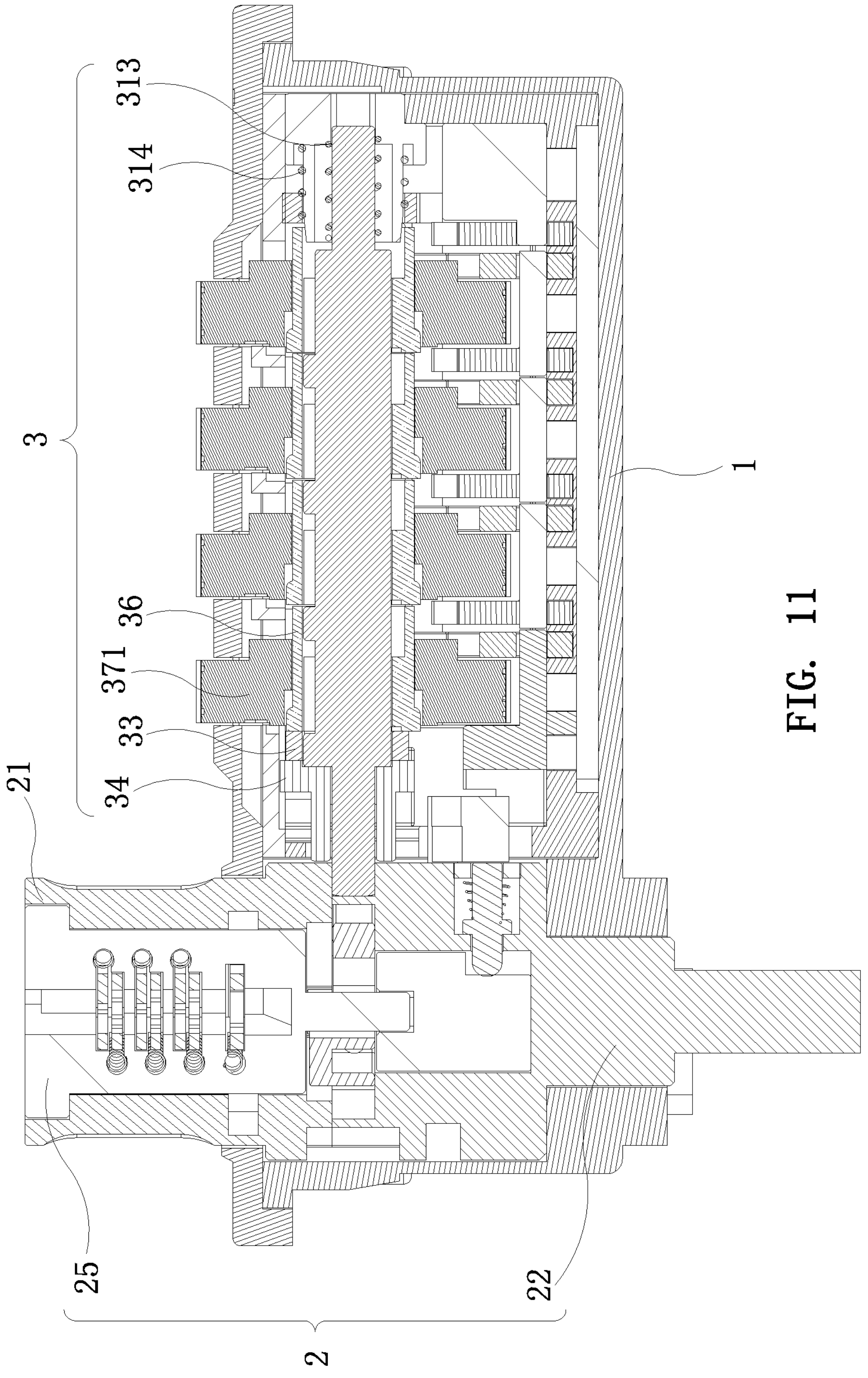
FIG. 11 is a longitudinal cross-sectional view of the present invention in a locked state.
Figure 12:
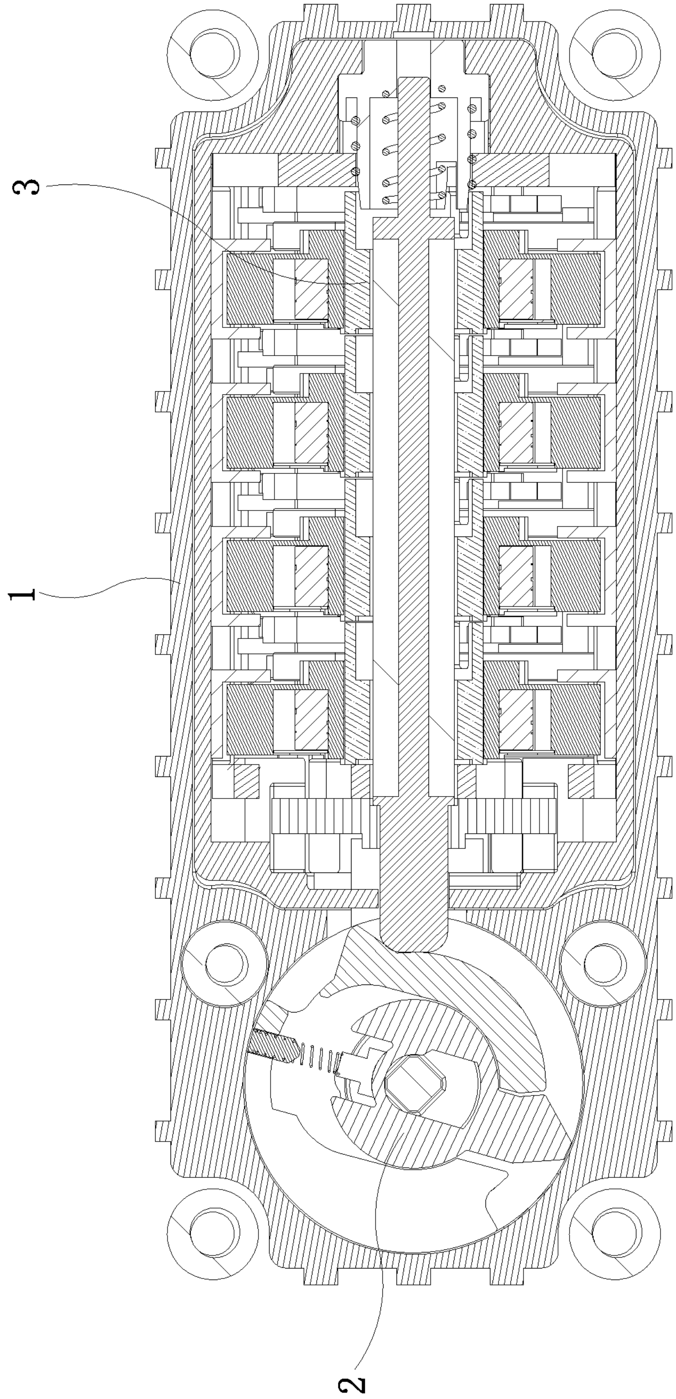
FIG. 12 is a transverse cross-sectional view of the present invention in an unlocked state.
Figure 13:
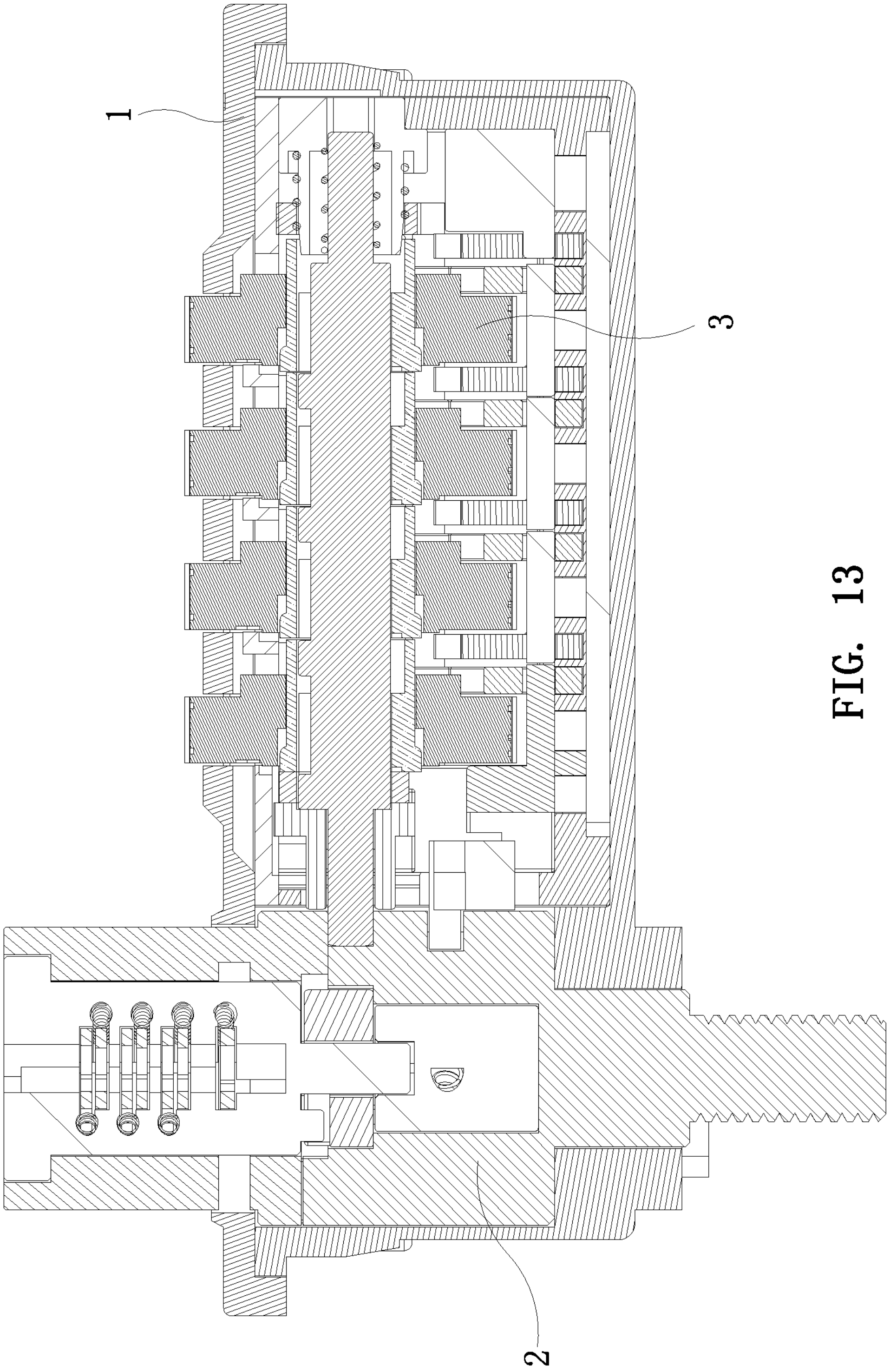
FIG. 13 is a longitudinal cross-sectional view of the present invention in an unlocked state.
Figure 14:
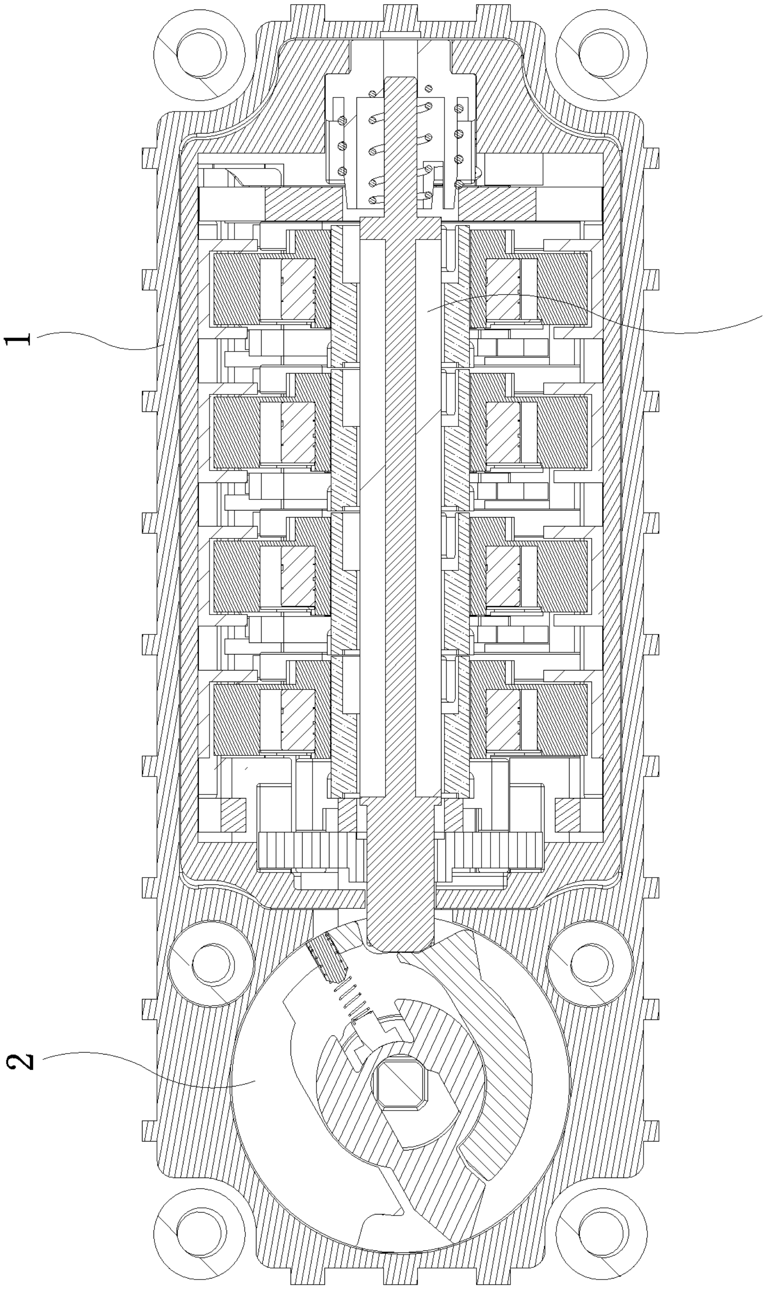
FIG. 14 is a transverse cross-sectional view of the present invention when the password is changed.
Figure 15:
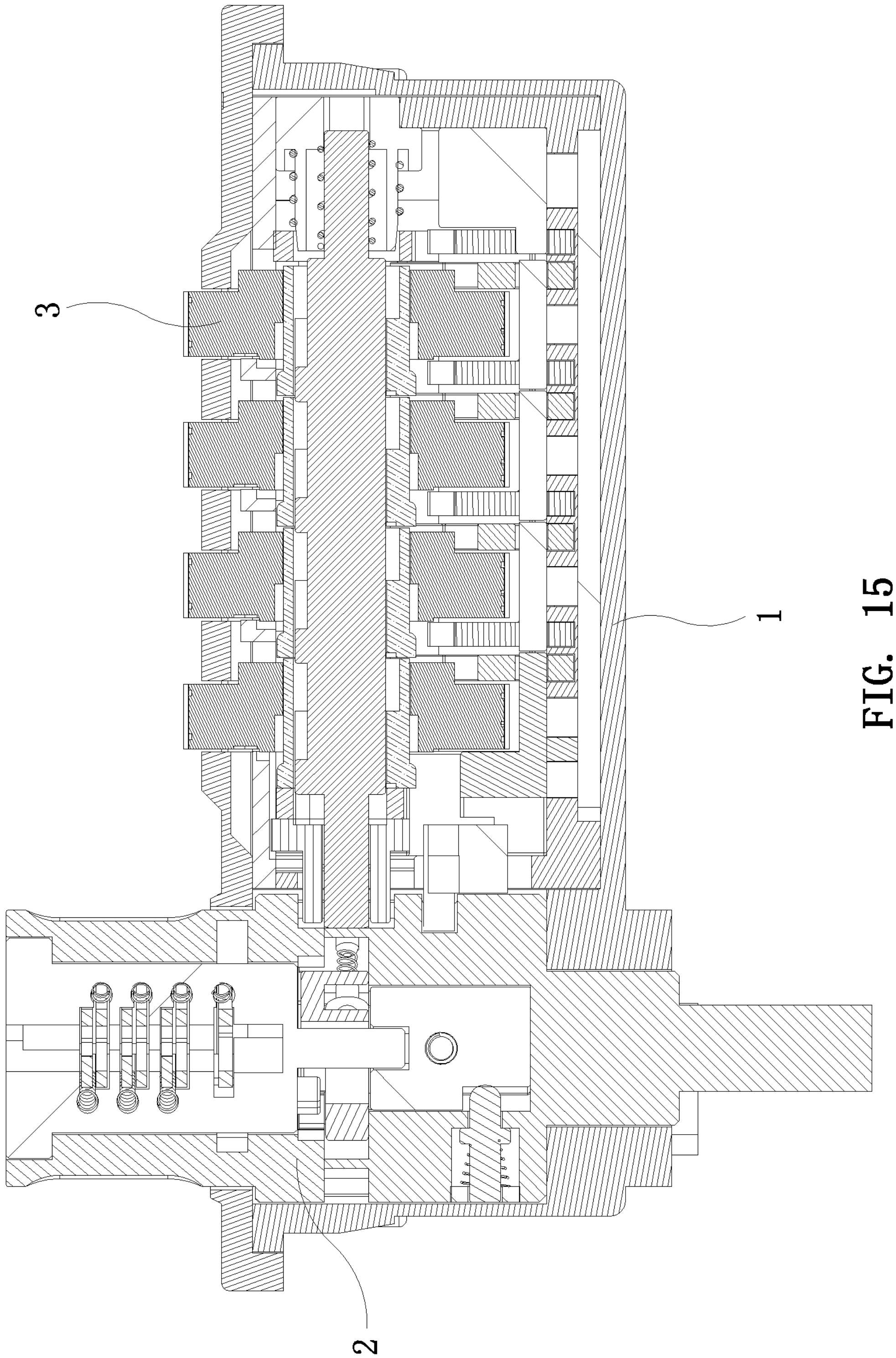
FIG. 15 is a longitudinal cross-sectional view of the present invention when the password is changed.

As shown in FIG. 5 and FIG. 3, the password box 3 includes a base 31, a cover 32, a holder 33, a slide block 34, a password shaft assembly 35, a plurality of bushings 36, a plurality of password wheel assemblies 37, a block ring 38, a plurality of password wheel positioning members 39, a plurality of buckles 310, a return elastic plate 311, a lifting rod 312, a password shaft spring 313, and a password change spring 314. The cover 32 is fixed to the top surface of the base 31. The bushings 36 are rotatably inserted through middle holes of the password wheel assemblies 37, respectively. Two ends of the password shaft assembly 35 movably pass through two ends of the holder 33, respectively. The password wheel assemblies 37 with the bushings 36 are confined in the holder 33. The slide block 34 is movably sleeved on one end of the password shaft assembly 35 and located outside the holder 33 close to the lock case 2. The stop ring 38 is movably sleeved on the other end of the password shaft assembly 35 and located outside the holder 33. The plurality of password wheel positioning members 39 and the plurality of buckles 310 are connected at intervals. The plurality of password wheel positioning members 39 and the plurality of buckles 310 are installed under the plurality of password wheel assemblies 37. The inner end of the password wheel positioning member 39 abuts against external teeth 372 of the password wheel assembly 37 (as shown in FIG. 9) to restrict rotation of the password wheel assembly 37. The return spring 311 is disposed between the inner end of the password wheel positioning member 39 and the base 31. The outer end of the password wheel positioning member 39 is movably in contact with the lifting rod 312. The lifting rod 312 is disposed under the password shaft assembly 35. One end of the lifting rod 312 is inserted in the inner cam groove 21 of the lock case 2 by clearance fit and is moved up and down along with rotation of the lock case 2. The password shaft spring 313 is disposed between the password shaft assembly 35 and the stop ring 38. The password change spring 314 is sleeved on the stop ring 38. Two ends of the password change spring 314 are pressed against the holder 33 and the stop ring 38, respectively.

Figure 6:
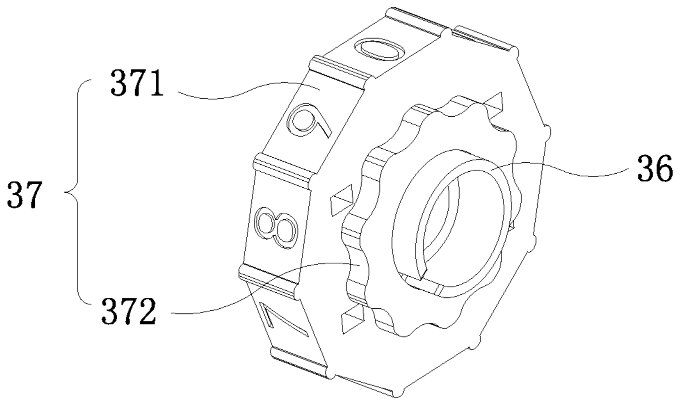
FIG. 6 is a right perspective view of the password wheel assembly of the present invention.
Figure 7:
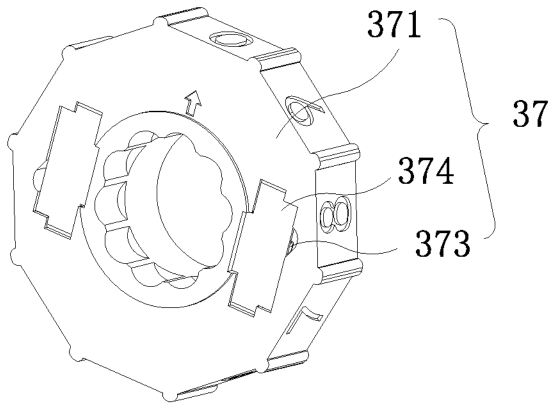
FIG. 7 is a left perspective view of the password wheel assembly of the present invention.

As shown in FIG. 6 and FIG. 7, the password wheel assembly 37 includes a password wheel 371, external teeth 372, a plurality of password wheel magnets 373, and a plurality of sealing sheets 374. The external teeth 372 are fixed on the side wall of the password wheel 371. The password wheel 371 is formed with magnet mounting grooves 3711. The password wheel magnets 373 are installed in the magnet mounting grooves 3711 of the password wheel 371 and are covered by the sealing sheets 374, respectively.

Figure 8:
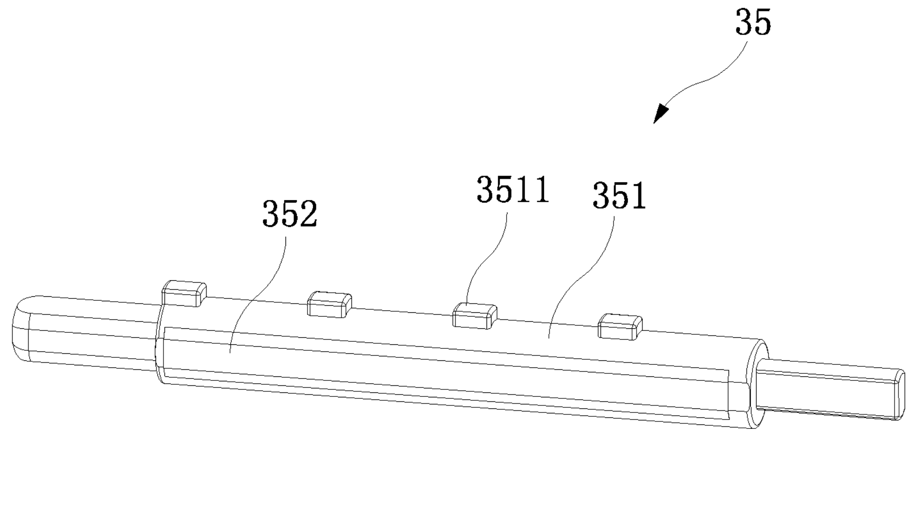
FIG. 8 is a perspective view of the password shaft of the present invention.

As shown in FIG. 8, the password shaft assembly 35 includes a password shaft 351 and a plurality of password shaft magnets 352. The password shaft magnets 352 are inlaid on the side wall of the password shaft 351. A plurality of protrusions 3511 are provided along the axial direction of the password shaft 351. The magnetic poles of the password shaft magnets 352 are distributed along the radial direction of the password shaft 351 and face the opposite magnetic poles of the password wheel magnets 373 in the password wheel assembly 37.

As shown in FIG. 5, the two ends of the holder 33 each have a baffle 331 perpendicular to the axial direction of the password shaft 351, and a shaft hole 332 is defined in the center of the baffle 331.

As shown in FIG. 16, by rotating the lock case 2, the lock case 2 and the password box 3 are cooperatively linked in different areas of the lock case 2. When in the transverse groove 224, the slide block 34 is against the outer wall of the lock case 2, and the password shaft assembly 35 enters the lock case 2. When in the radial groove 222, the slide block 34 can enter the lock case 2, and the password shaft assembly 35 can also enter the lock case 2. In this way, the bushing 36 is separated from the password wheel only when the lock case 2 is turned to the end of the radial groove 222, and keeps in a state of being coupled with the password wheel assembly 37 at other times. At the same time, the raised block 223 blocks the password shaft assembly 35 and holds the slide block 34. Only the password is correct, the password shaft assembly 35 can pass. In this way, the password can be kept unchanged when the lock is unlocked, that is, when in the transverse groove 224. Only when the lock is in the radial groove 222, the password of the lock can be reset. This mode is called a "fixed mode" to distinguish it from the other mode in the second embodiment.

The working principle of the present invention is described below.

As shown in FIG. 3, FIGS. 10-15, in the locked position, each password wheel assembly 37 is turned to make each password wheel assembly 37 in the correct password position. At this time, each protrusion 3511 on the password shaft 351 is aligned with the through hole of the corresponding bushing 36, so that the password shaft 351 can move left and right relative to each bushing 36. At this time, the lock case 2 is turned, the lock tongue 24 is blocked on the lock case 2 due to its actuated tip, the password wheel is pushed to move left, (when the password is incorrect, the password wheel shaft is jammed), and the password shaft 351 can pass through the lock tongue 24. At the same time, the rotation of the lock case 2 causes the inner cam groove 221 of the lock case 2 to drive the lifting rod 312 to move up and down. The lifting rod 312 drives the password wheel positioning member 39 to rotate, so that the password wheel assembly 37 is not jammed by the password wheel positioning member 39. The password wheel assembly 37 returns to the initial position under the action of magnetic force. The left side of the slide block 34 is jammed on the outer circumference of the lock case 2, and the right side of the slide block 34 is against the holder 33. The bushing 36 is in the middle of the holder 33, so that the bushing 36 is always in a coupled state with the password wheel 371 during the rotation. Therefore, the bushing 36 is rotated together with the password wheel assembly 37, and the password is unchanged, so as to unlock the lock. After being unlocked, through the raised block 223 on the lower lock case 22, the password wheel 371 is not in the correct password position because it has automatically returned to its position, and the password shaft 351 cannot continue to rotate. The correct password is entered again, the protrusion 3511 of the password shaft 351 is aligned with the through hole of the corresponding bushing 36, and the password shaft 351 is moved left again. After that, since the lower lock case 22 is has the radial groove 222, the slide block 34 can move left. At this time, the password change spring 314 pushes the holder 33 to move left, the holder 33 pushes the slide block 34 to move left, and the slide block 34 enters the radial groove 222 of the lock case 2. At the same time, the bushing 36 is also moved left along with the holder 33. The bushing 36 and the password wheel 371 are not in a coupled state. At this time, the password wheel 371 is turned, the bushing 36 is not rotated along with the password wheel 371, and the required password can be set. After the setting is completed, the lock case 2 is rotated reversely, and the slide block 34 is jammed on the outer circumference of the lock case 2 again. The holder 33 is pushed right, and the bushing 36 is also moved right along with the holder 33 to be in a coupled state with the password wheel 371. The lock case 2 is further rotated reversely, and the inner cam groove 221 of the lock case 2 drives the lifting rod 312 to move. The lifting rod 312 drives the password wheel positioning member 39 to move, so that the password wheel assembly 37 is not jammed and returns to the initial state under the action of magnetic force. At the same time, the password shaft 351 pushes the lock tongue 24 into the lock case 2. The lock case 2 is rotated, the password shaft 351 returns to the locked position, and the lock tongue 24 is pushed back to the original position by the lock tongue spring 23. In this way, the password is set successfully, and the lock is in a locked state.

Figure 17:
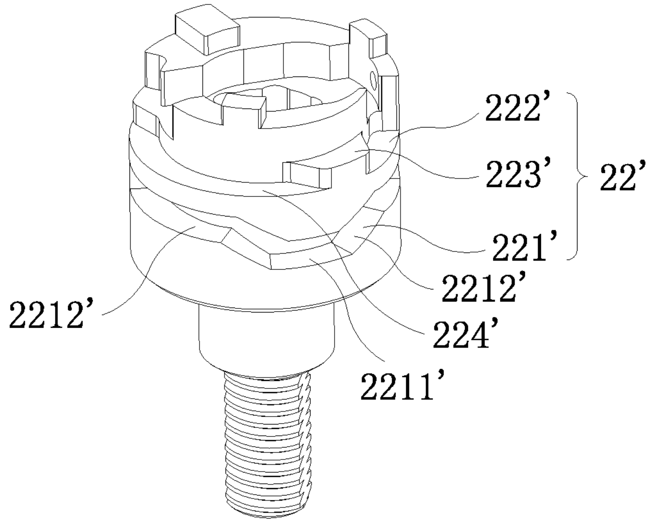
FIG. 17 is a schematic view of the top of the lower lock case according to a second embodiment of the present invention.

As shown in FIG. 17 with reference to FIG. 3, this embodiment is substantially similar to the above embodiment, except that the structure of the lower lock case 22' is different, and it is in a free mode. In this embodiment, the outer wall of the lower lock case 22' has an inner cam groove 221' arranged along the axial direction of the lower lock case 22' rotating in the housing, a radial groove 222' arranged along the radial direction of the lower lock case 22' rotating in the housing 1, a transverse groove 224' arranged along the axial direction of the lower lock case 22' rotating in the housing, and a raised block 223' disposed between the radial groove 222' and the transverse groove 224'. The inner cam groove 221' is composed of a plurality of transverse groove segments 2211' and a plurality of inclined groove segments 2212'.

In this embodiment, by rotating the lock case 2', the lock case 2' and the password box 3' are cooperatively linked in different areas of the lock case 2'. When in the transverse groove 224', the slide block 34 enters the lower lock case 22'. When the lock case 2' is rotated to the leftmost end, the slide block 34 is against the outer surface of the lock case 2'. When the lock case 2' is turned to the radial groove 222', the slide block 34 will be in the lock case 2'. No matter what period of time, the password shaft 351 is always free to enter and exit the lock case 2' and is not in contact with the raised block 223'. In this way, when the lock is unlocked, that is, when the lock case 2' is turned to the radial groove 222', the password is in a free setting state; when the lock is locked, that is, when the lock case 2' is turned to the leftmost end, the lock is in a locked state. This mode is called a "free mode". It should be noted that, in order to make the force of the slide block more balanced during the movement, the upper lock case of the present invention is also provided with the same transverse groove and radial groove as the lower lock case.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. An improved password lock, comprising:

a housing;

a lock case;

a password box;

the lock case being rotatably fitted in one side of an accommodating cavity of the housing;

the password box being installed in another side of the accommodating cavity of the housing;

the password box being cooperatively linked with the lock case;

an outer wall of the lock case having:

an inner cam groove arranged along an axial direction of the lock case rotating in the housing, a radial groove arranged along a radial direction of the lock case rotating in the housing, a transverse groove arranged along the axial direction of the lock case rotating in the housing, and a raised block disposed between the radial groove and the transverse groove;

the inner cam groove being composed of a plurality of transverse groove segments and a plurality of inclined groove segments;

the password box including:

a base, a cover, a holder, a slide block, a password shaft assembly, a plurality of bushings, a plurality of password wheel assemblies, a block ring, a plurality of password wheel positioning members, a plurality of buckles, a return elastic plate, a lifting rod, a password shaft spring, and a password change spring;

the cover being fixed to a top surface of the base;

the plurality of bushings being rotatably inserted through middle holes of the plurality of password wheel assemblies respectively;

two ends of the password shaft assembly movably passing through two ends of the holder respectively;

the plurality of password wheel assemblies with the plurality of bushings being confined in the holder;

the slide block being movably sleeved on one end of the two ends of the password shaft assembly and located outside the holder close to the lock case;

the block ring being movably sleeved on another end of the two ends of the password shaft assembly and located outside the holder;

the plurality of password wheel positioning members and the plurality of buckles being connected at intervals, the plurality of password wheel positioning members and the plurality of buckles being installed under the plurality of password wheel assemblies;

an inner end of each of the plurality of password wheel positioning members abutting against external teeth of a corresponding one of the plurality of password wheel assemblies to restrict rotation of the corresponding one of the plurality of password wheel assemblies;

the return elastic plate being disposed between the inner end of each of the plurality of password wheel positioning members and the base, an outer end of each of the plurality of password wheel positioning members being movably in contact with the lifting rod, the lifting rod being disposed under the password shaft assembly, one end of the lifting rod being inserted in the inner cam groove of the lock case by a clearance fit and being moved up and down along with rotation of the lock case;

the password shaft spring being disposed between the password shaft assembly and the block ring, the password change spring being sleeved on the block ring; and two ends of the password change spring being pressed against the holder and the block ring, respectively.

2. The improved password lock as claimed in claim 1, wherein the lock case includes an upper lock case, a lower lock case, a lock tongue spring, a lock tongue, and a lock core;

the upper lock case is fixedly engaged with the lower lock case;

the lock tongue is movably installed in a space formed by the upper lock case and the lower lock case;

an outer end of the lock tongue extends outwardly, the lock tongue spring abuts against an inner end of the lock tongue, and the lock core is fixedly fitted in the upper lock case.

3. The improved password lock as claimed in claim 1, wherein each of the plurality of password wheel assemblies includes a password wheel, the external teeth, a plurality of password wheel magnets, and a plurality of sealing sheets;

the external teeth are fixed on a side wall of the password wheel, the password wheel is formed with magnet mounting grooves, and the plurality of password wheel magnets are installed in the magnet mounting grooves of the password wheel and are covered by the plurality of sealing sheets, respectively.

4. The improved password lock as claimed in claim 1, wherein the password shaft assembly includes a password shaft and a plurality of password shaft magnets;

the plurality of password shaft magnets are inlaid on a side wall of the password shaft;

a plurality of protrusions are provided along an axial direction of the password shaft, and magnetic poles of the plurality of password shaft magnets are distributed along a radial direction of the password shaft and face opposite magnetic poles of the plurality of password wheel magnets in the password wheel assembly.

5. The improved password lock as claimed in claim 1, wherein the two ends of the holder each have a baffle perpendicular to an axial direction of the password shaft, and a shaft hole is defined in a center of the baffle.

6. The improved password lock as claimed in claim 1, further comprising a tongue; the tongue being fixedly sleeved on a penetrating end, penetrating through the housing, of the lock case.

7. The improved password lock as claimed in claim 1, wherein the housing is composed of a shell and a panel; the panel is fixed on a top surface of the shell to form the accommodating cavity of the housing.

* * * * *